(12) United States Patent
Stover (10) Patent No.: US 8,052,040 B2
(45) Date of Patent: Nov. 8, 2011

(54) NEGOTIABLE INSTRUMENT WITH FRAUD PROTECTION

(76) Inventor: Merlin D. Stover, Spirit Lake, IA (US)

( * ) Notice: Subject to any disclaimer, the term of this patent is extended or adjusted under 35 U.S.C. 154(b) by 1314 days.

(21) Appl. No.: 11/372,300

(22) Filed: Mar. 9, 2006

(65) Prior Publication Data

US 2006/0144924 A1    Jul. 6, 2006

Related U.S. Application Data

(63) Continuation-in-part of application No. 10/696,231, filed on Oct. 29, 2003, now Pat. No. 7,040,539.

(51) Int. Cl.
G06Q 40/00    (2006.01)

(52) U.S. Cl. .......................... 235/379; 705/45

(58) Field of Classification Search .................. 235/379, 235/380, 381, 462.01, 487; 283/57, 58; 382/115, 382/116, 137; 705/35, 45
See application file for complete search history.

(56) References Cited

U.S. PATENT DOCUMENTS

| | | | |
|---|---|---|---|
| 4,454,610 A | 6/1984 | Sziklai | |
| 5,326,136 A | 7/1994 | Doyle | |
| 5,355,411 A | 10/1994 | MacDonald | |
| 5,504,822 A | 4/1996 | Holt | |
| 5,506,691 A | 4/1996 | Bednar et al. | |
| 5,509,692 A * | 4/1996 | Oz | 283/70 |
| 5,537,486 A | 7/1996 | Stratigos et al. | |
| 5,544,255 A | 8/1996 | Smithies et al. | |
| 5,559,895 A | 9/1996 | Lee et al. | |
| 5,594,226 A | 1/1997 | Steger | |
| 5,823,575 A * | 10/1998 | Ives | 283/58 |
| 5,838,814 A * | 11/1998 | Moore | 382/115 |
| 5,863,073 A * | 1/1999 | Taskett | 283/58 |
| 5,863,074 A * | 1/1999 | Wilkinson | 283/58 |
| 5,939,699 A | 8/1999 | Perttunen et al. | |
| 5,984,366 A * | 11/1999 | Priddy | 283/72 |
| 6,073,121 A * | 6/2000 | Ramzy | 705/45 |
| 6,089,610 A * | 7/2000 | Greene | 283/57 |
| 6,170,744 B1 * | 1/2001 | Lee et al. | 235/380 |
| 6,212,504 B1 | 4/2001 | Hayosh | |
| 6,233,340 B1 * | 5/2001 | Sandru | 380/51 |
| 6,390,362 B1 | 5/2002 | Martin | |
| 6,523,741 B1 | 2/2003 | DiMaria et al. | |
| 6,575,362 B1 | 6/2003 | Bator et al. | |
| 6,764,015 B1 * | 7/2004 | Pearson | 235/487 |
| 7,051,206 B1 * | 5/2006 | Giest et al. | 713/176 |
| 2002/0040344 A1 | 4/2002 | Preiser et al. | |
| 2002/0065771 A1 | 5/2002 | Dutta | |
| 2002/0067827 A1 * | 6/2002 | Kargman | 380/54 |
| 2002/0179709 A1 | 12/2002 | Mehler | |
| 2002/0184152 A1 | 12/2002 | Martin | |
| 2003/0056104 A1 | 3/2003 | Carr et al. | |
| 2003/0173406 A1 | 9/2003 | Bi et al. | |
| 2003/0182214 A1 * | 9/2003 | Taylor | 705/35 |

* cited by examiner

Primary Examiner — Thien M. Le
Assistant Examiner — Christopher Stanford
(74) Attorney, Agent, or Firm — McKee, Voorhees & Sease, P.L.C.

(57) ABSTRACT

A negotiable instrument with fraud and identity theft protection and method of use is provided. The method includes step accepting a negotiable instrument having a pre-printed bar code, reading the bar code on a negotiable instrument using a bar code scanner, and receiving from the writer a code presented to the merchant for deriving personal information associated with the account holder and banking information associated with the account from the bar code. The method also having the step of comparing the personal identification information from the bar code with information provided by the writer. The merchant using the bank processing information derived from the bar code to process the negotiable instrument.

8 Claims, 6 Drawing Sheets

NEGOTIABLE INSTRUMENT WITH FRAUD PROTECTION

CROSS-REFERENCE TO RELATED APPLICATIONS

This application is a Continuation-in-part of patent application U.S. Ser. No. 10/696,231 filed Oct. 29, 2003, which is herein incorporated by reference in its entirety.

BACKGROUND OF THE INVENTION

Checks, traveler's checks, and money orders are well known popular methods of payment in retail sales. A check is convenient for the customer to access available funds without carrying cash. In addition, merchants who accept checks increase their revenues because a transaction with checks do not come with the expense of a percentage of the sale going to a credit card company such as Visa, MasterCard, Discover, and American Express.

However, it is also well known that customers and merchants are victims of check fraud and identity theft on a daily basis. Both check fraud and identity theft may be significantly reduced if the person signing the check is accurately determined to be the person authorized to do so, as well as if the account holder's personal information is not disclosed on the face of the check and/or the account information is kept from being disclosed in a visually decipherable form. Unfortunately, the prior art checks all have personal information typed upon the face of the check including the name, address and phone number of the check writer, as well as the account number, routing number and check number and therefore this information cannot be asked of the check writer nor used as a security measure. Moreover, open use of this personally identifying and account information upon the face of the check affords would-be fraudulent users with unchecked access to key information about the check writer and the account. Left unprotected, this information could be compromised by employees of the store, the merchant, the account holder's bank, the mailing service, the trash service, would-be thieves and finders alike, including other interested on-looking eyes. Such availment at all levels of the check writer's personal and account information ultimately lends to the possibility of fraud and/or identity theft.

With the advent of personal banking computer programs and the increasing availability of check printing programs, little information is needed to create and print fraudulent negotiable instruments, prepare false deposit slips and other forms of identity theft. Unfortunately, the information that should be protected from immediate view in the prior art checks is left fully exposed for those farming for information to harvest and use. In fact, the prior art checks offer little or no resistance, deterrence or prevention of fraud or identity theft to even the would-be casual observer, not to mention the hardened criminal.

Accordingly, an objective of the present invention is to hide personal and account information from the face of the check and to replace it with a bar code that hides the information from a would-be fraudulent check writer and/or identity theft, but still permits a merchant who is validating the negotiable instrument to access the information, but not necessarily without an additional PIN or password entered or spoken by the person professing to be the account holder.

A negotiable instrument having little or no personal and account information immediately visible to an observer would better insulate the store owner, store employees, issuing bank and others from claims of fraud or identity theft. The prior art checks do not put the owner, store employees, issuing bank and others in the best possible position to identify a would-be fraudulent check user or identity theft.

Therefore, an objective of the present invention it to provide those entrusted with the care of a negotiable instrument with the best possible mechanisms to recognize a fraudulent check user and/or identity theft, as well as to prevent the fraudulent use and proliferation of these negotiable instruments in commerce.

A negotiable instrument should also put would-be fraudulent users or identity thieves on notice that the negotiable instrument and the associated account is a fraud and identity theft resistant account. The checks in the prior art do not necessarily have the appropriate mechanisms in place to thwart off would-be fraudulent use or theft of identity.

Accordingly, another feature of the present invention is the inclusion of an ID Theft Protection Hotline telephone number, in addition to the use of bar codes, to act as a further deterrent for discouraging someone from actually attempting to use the check and/or comprising any uncoded information presented on the face of the check.

Still another feature of the present invention is the inclusion of an ID Theft Protection Hotline telephone number effectively located near the bar code to provide the merchant, the actual check owner and/or the would-be finder of the lost checks with a quick reference number to the bank to inform the bank that the checks have been lost or stolen.

Bar codes have been used on checks in the prior art to store information on pre-printed checks. For example, U.S. patent application 2002/0065771A1 to Dutta discloses bar codes used to store an account number. However, this feature does not both contribute to the security of the check writer while acting as a deterrent to identity theft, but is primarily an aid in assisting commerce. It does not include the combination of valuable information about the user, including their name, address, telephone number, and/or any other personally identifying information.

In addition, some bar codes have been placed upon checks with the same bar code as on a drivers license number as in U.S. Pat. No. 5,594,226 to Steiger. However, this driver's license code only provides the drivers license number, not any personally identifying information that could be readily asked of the check writer such as their name, home address, or telephone number.

Bar codes in the prior art are either two-dimensional (2-D) or one-dimensional (1-D). U.S. Pat. No. 6,575,362 issued to Bator employs a system which uses a 2-D bar code which is printed (not pre-printed) upon a money order which includes information about the money order request, authorization code, and printed information on the money order coupon. Bator uses a technique to generate the label in accordance with the techniques disclosed in Berson U.S. Pat. No. 5,388,158. As described in Berson, a 2-D bar code can currently hold up to 1,800 characters in the area of a postage stamp and may be used to store graphic information. In contrast, 1-D bar codes hold far fewer characters and are used only for alphanumeric characters, namely a decimal digit or a letter. Bator teaches a method of creating a security label, however, the security label is printed after the checks are formed or the money order written and includes information that could not be accurately anticipated at the time the checks were initially printed. In summary, Bator does not solve the problems associated with check fraud identity validation at the time of writing the check. Therefore, a further objective of the present invention is to include a bar code which utilizes a two dimensional bar code which provides meaningful information, probative of theft identification, to the merchant regarding the name, telephone number, address, and photo I.D. of the user.

A still further feature of the present invention is the inclusion of a bar code on the pre-printed checks which deters people from writing fraudulent checks. Bar codes are generally well known to contain information that is imperceptible to the human observer. The upper left hand corner of the check is a typical area used for personal identification information. Accordingly, a still further feature of the present invention is to effectively locate the bar code to maximize the deterrence effect upon the fraudulent check writer and put the check writer on notice that personal identification information is stored within the bar code.

Finally, a still further objective of the present invention is the inclusion of a bar code on the pre-printed checks, which encrypts the account number, routing number and check number, including name, address, phone number, signature and picture identification of the account holder leaving the face of the negotiable instrument void of all sensitive information. The decryption of the bar code occurring at the point and time of transaction, but not before the account holder enters a security code or PIN number to allow the merchant to access and view the encrypted information. The encrypted bar code insures that the merchant and the would-be fraudulent user or identity theft would not be able to comprise the sensitive information presented on the face of check. The encrypted bar code would also allow the actual account holder to insure that access to the information was only for personal identification purposes before the merchant accepts the negotiable instrument as tender. The sensitive account holder information would only be visible during the transaction to insure the information was not comprised after the transaction. The professed account holder could contact the I.D. Theft Hotline if the account holder is unable to remember his or her PIN or security code during the checkout process. Moreover, the merchant never has access to the security code or PIN number to decrypt the bar code and gain access to the account holder's personal information because the PIN or security code is entered by the account holder hidden from the view of the merchant and other casual observers. If in fact the professed account holder were unable to verify his or her identity, the merchant would be able telephone the I.D. Theft Hotline to notify the issuing bank of the possibility of the account and checks being lost, stolen or fraudulently used. Upon the account holder entering an accepted PIN or security code the account information is displayed and viewable only to the merchant who then verifies the listed information with personally identifying information provided by the account holder. The actual account holder, after successfully entering the correct PIN or security code and the merchant verifying the account information, can then inquire of the merchant regarding the decrypted information for such things as the check number.

Checks are often used to provide payment for services or goods where the check writer is not present, but rather sends a signed check to the payee through the mail. In this regard, checks have become a safer form of payment over cash. However, checks are still at risk of being fraudulently comprised or having personally identifying information taken while in transit or processing.

Accordingly, another objective of the present invention is to provide a check having no personally identifying information on its face, except for the account holder's signature and a PIN number or security code written on the signature line of the check. Carbon copy checks have security measures built into the signature line to keep the PIN number and the account holder's signature hidden from view. Thus, the account holder is able to use prior art checks having carbon copy records while keeping the PIN number or security code hidden from view. The PIN number or security code would be used to verify the identity of the check writer and the signature to authenticate the check. The PIN number or security code would allow the merchant to process the check in the physical absence of the check writer, after verifying the check writer's identity. For example, the merchant would receive the check and scan the bar code of the check. The computer system would ask the merchant to enter a PIN number or security code to derive the account holder's personal identification information contained within the bar code. The merchant would then enter the PIN number or security code written on the signature line. The merchant's computer system would then read the bar code and display the account holder's personally identifying information, the bank account number, bank routing number and check number. Using this information, the merchant would be able to positively verify that the check writer and the account holder are the same individuals, as well as process and post the check using the account number, bank routing number and check number. Someone trying to fraudulently use the checks would not have access to the PIN number or security code associated with the account and therefore would not have access to the account holder's personal information. Thus, the check would-be rendered useless for being used fraudulently or for identity theft. To accommodate the varying uses of a check, multiple PIN numbers or security codes could be associated with the account. One PIN number or security code could be used for transactions when the account holder is physically present and another PIN number or security code for transactions when the account holder is not physically present at the point and time of the transaction. Having a separate PIN number or security code for mailing checks as opposed to the account holder being physically present at the point and time of the transaction would further frustrate would-be identity thefts and fraudulent use of checks. For example, if a thief were to steal the account holder's checks they would not be able to use them even if they had somehow compromised the PIN number or security code associated with account. At the point and time of transaction, the thief would be able to provide the PIN number or security code associated with the account but would not have foreknowledge of the account holder's personally identifying information. In the event the thief uses the check through the mail, the PIN number or security code associated with the account would only work if the account holder were physically present. Thus, the account provides both the account holder and the merchant with mechanisms to prevent fraudulent use of the account or identity theft.

The method and check with fraud and identity theft protection for accomplishing these and/or other objectives and features of the present invention will become apparent from the detailed description which follows.

SUMMARY OF THE INVENTION

A method of using a fraud and identity theft resistant checking account to avoid acceptance by a merchant of a fraudulent check and to preserve the identity of an account holder is provided. The method has a step of receiving a negotiable instrument from a check writer having a pre-printed bar code and an identification theft protection hotline. The method also has the step of concealing from view using the pre-printed bar code personal identification information having a photo identification, a signature, an address, a phone number and a name of the account holder, as well as concealing from view using the pre-printed bar code bank identification information having a bank routing number, a bank account number and a check number. The method has another step of scanning the pre-printed bar code. The method has still another step of receiving a code with the check, the code being associated with the checking account for deriving personal and bank identification information from the pre-printed bar code. The method has an additional step of comparing the personal identification information of the account holder derived from the pre-printed bar code with the address, the phone number and the name of the check writer. The method has another step of comparing the photo identification of the account holder derived from the pre-printed bar code with the check writer. The method has yet another step of comparing the signature of the account holder derived from the pre-printed bar code with the signature placed by the check writer upon the check at the point and time of the transaction. The method has an additional step of determining by the merchant whether to accept or refuse the check at the point and time of the transaction by verifying a match between the identity of the account holder and the check writer based on the steps of comparing the personal identification information derived from the pre-printed bar code with the information provided by the check writer, comparing the photo identification of the account holder derived from the pre-printed bar code with the check writer, and comparing the signature of the account holder derived from the pre-printed bar code with the signature of the check writer placed upon the check at the point and time of the transaction. Finally, the method has a step of processing by the merchant of the check for payment by using the bank routing number, the bank account number and the check number derived from the pre-printed bar code; and contacting by the merchant the identification theft hotline at the point and time of the transaction to alert a bank associated with the checking account of a fraudulent use of the check, the personal information and/or the banking information associated with the account. The pre-printed signature of the account holder is visible on the check and not hidden from view using the pre-printed bar code. And, the method includes an additional step of comparing the pre-printed signature of the account holder upon the check with the signature of check writer placed upon the check before receiving the code to derive the personal and bank identification information from the pre-printed bar code. The photo identification of the account holder is visible on the check and not hidden from view using the pre-printed bar code. In addition, the method has an additional step of comparing the photo identification upon the check to the check writer before receiving the code to derive the personal and bank identification information from the pre-printed bar code. The personal and bank identification information is only viewable by the merchant at the point and time of the transaction after receiving from the check writer the code for deriving the pre-printed bar code. Moreover, the method has another step of writing a second code associated with the account on the check for deriving the personal and banking information when the check writer is not physically present at the point and time of the transaction. The method also uses the step of entering by the check writer the code associated with the account into a code-receiving device for deriving the personal and banking information associated with the account.

DETAILED DESCRIPTION OF THE PREFERRED EMBODIMENT

Figure 1:
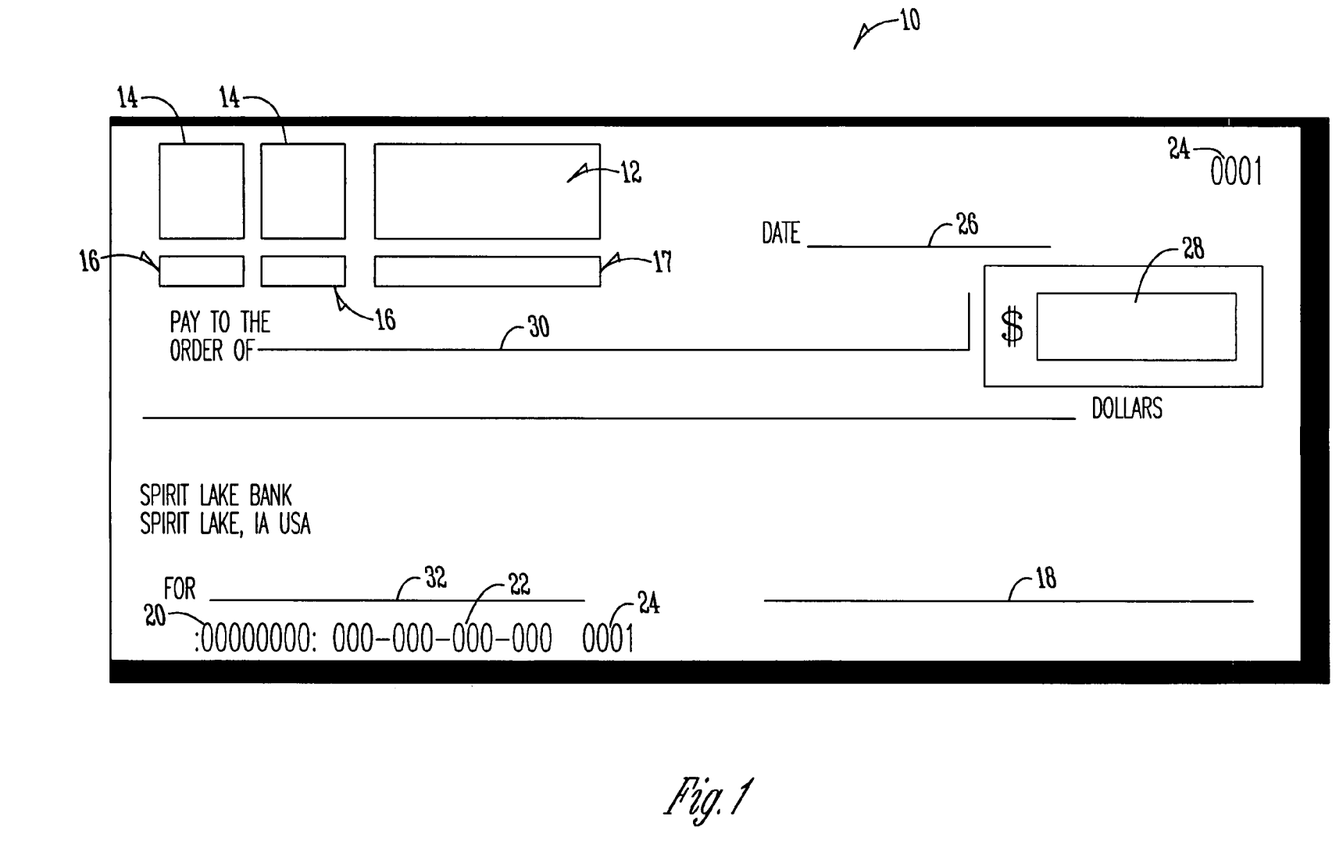
FIG. 1 is a top plan view of a check with fraud and identity theft protection.

As seen in FIG. 1, a check with fraud and identity theft protection is generally referred to by numeral 10. Although the term check is used, it is to be understood that checks are part of a broader class called negotiable instruments. Other negotiable instruments may be used interchangeably with the present invention including money orders and traveler's checks.

Figure 2:
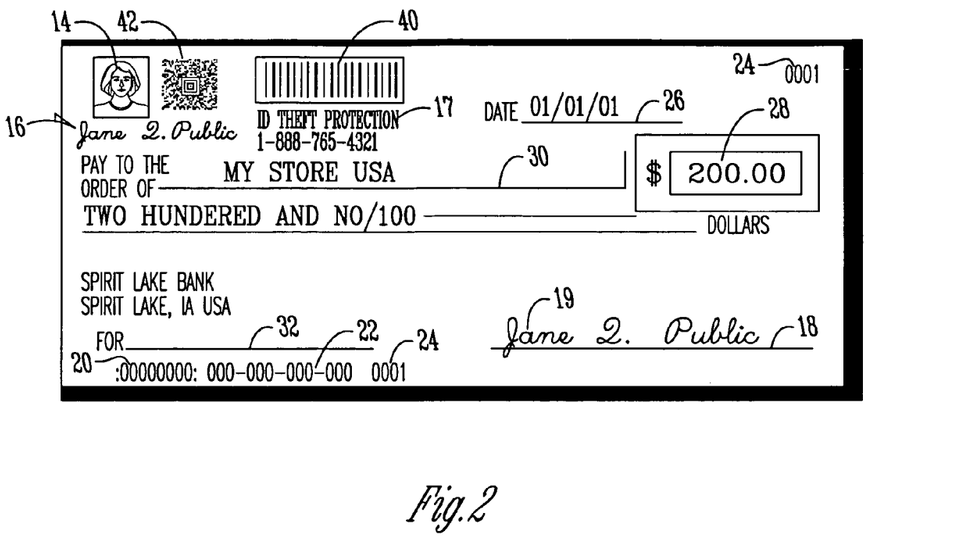
FIG. 2 is a top plan view of an example of a negotiable instrument with fraud and identity theft protection.

The check 10 has a bar code region 12, as illustrated by FIG. 1. The bar code contains personal identification information including a valid check writer's home address and telephone number. Other personal information may be included in the bar code and include a pin number (secret number), social security number, telephone number, driver's license number, password, account number, bank routing number, check number and a digital signature and/or picture. In addition, a description of the account holder may be included in the bar code, displaying such personally identifying information as date of birth (DOB), gender, height, weight, as well as eye and hair color. The bar code 12 in FIG. 1, as seen in FIG. 2, may be either a one dimensional (1-D) 40 or two dimensional (2-D) 42 bar code. The 1-D bar code 40 lends itself well to data which is alphanumerical characters. The 2-D bar code 42 lends itself to both alphanumerical data as well as graphics data such as is needed to show a photograph or a digital signature.

A 1-D bar code may be of various types including, but not limited to, Universal Product Code (UPC), EAN, JAN or UPC code 128. A 1-D bar code can be read by an existing bar code scanner employed by the merchant (e.g. NCR 7880 or NCR 7835), allowing the merchant to forego installing additional scanning equipment. In addition, the 2-D system may be a PDF-417 and hold approximately 1,800 characters in the area the size of a postage stamp. It should be noted however, that there are other 2-D codes which would work equally as well.

The check also has a photo I.D. 14 of the user. The check may have two photographs for each person in a joint checking account or the check 10 may have a single picture of a person with only a single account. Under each photo identification 14 is a account holder's pre-printed signature 16.

Figure 3:
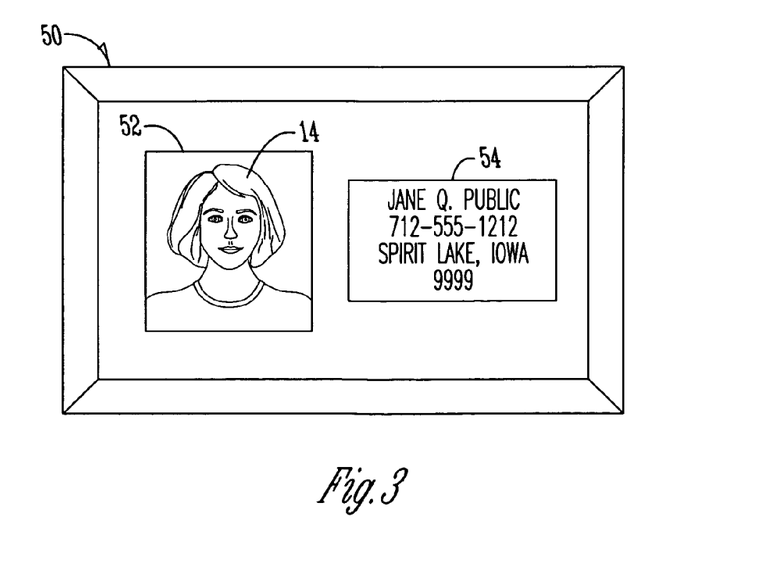
FIG. 3 is a front view of a computer screen displaying personal information hidden in the bar code regions of FIG. 2.

The check 10 also has other features common of negotiable instruments including a signature line 18, a bank routing number 20, an account number 22, a check number 24, a date line 26, an amount box 28, a payee 30, and a memo line 32. As seen in FIG. 2 the invention may have a 1-D bar code 40 or a 2-D bar code 42. The example shows a photo I.D. 14, a signature 16 underneath the photo I.D. 14 matching the signature 19 on the signature line 18. When the merchant scans the check 10, a picture shows up on a computer screen 50 displaying the personally identifying information hidden in the bar code. The information may be a text display 54 and an image display 52, when a 2-D barcode is used. The image display 52 provides the merchant with a digital photo 14 of the account holder to verify the identity of the check writer. The text display 54 provides the merchant with the account holder's name, address and phone number. The text display 54 may also provide the account holder's pin number. The merchant is then able to use the information in the text 54 and image 52 displays to verify the identity of the check writer and insure that the check writer is indeed the account holder. Where the text display 54 includes the pin number, the merchant may verify identity in part by having the check writer enter their pin number.

The check 10 also has another feature for discouraging and deterring would-be fraudulent users and identity thieves. Effectively located near either the 1-D 40 or 2-D 42 bar code is an I.D. Theft Hotline 17 displaying a toll-free number for contacting the issuing bank to inform them that the account holder's checks have been stolen, lost or fraudulently compromised. The I.D. Theft Hotline can also be used by the account holder to verify personally identifying information on the check, alert the bank of fraudulent activity on the account or for contacting the proper authorities.

Figure 4:
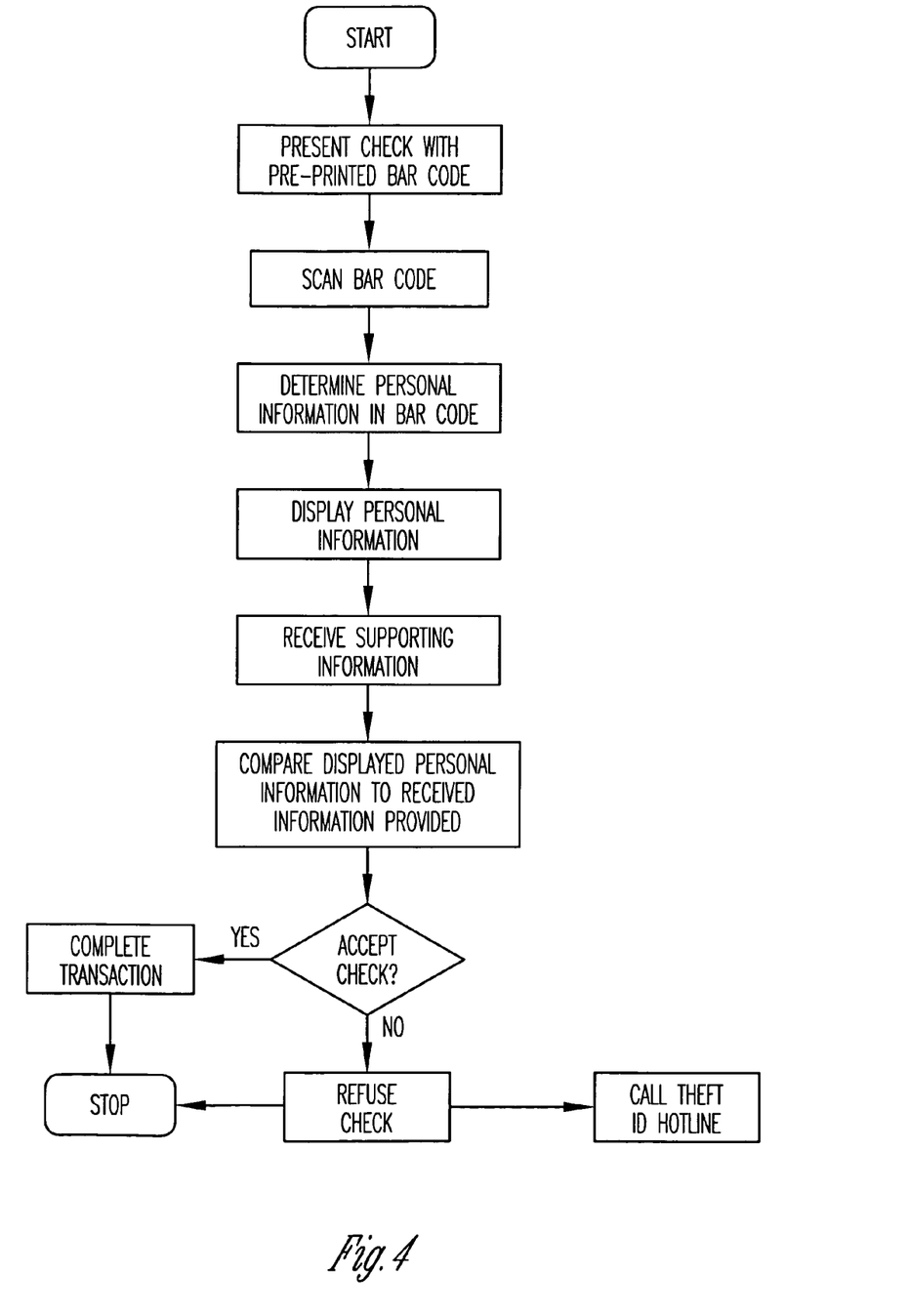
FIG. 4 is a flow chart of the method of the present invention.

The method of use is outlined in the flow chart as seen in FIG. 4. The check writer presents the check 10 with the pre-printed bar code 12 to a merchant. The merchant accepts the check 10 and notes that it contains a pre-printed bar code 10, a photo identification 14, a pre-printed signature 16, and an I.D. Theft Identification Hotline toll-free telephone number 17. The merchant then scans the check 10 to determine the personal identification information hidden within the bar code 40 or 42. The bar code scanner translates the information in the bar code 40 or 42 and then displays the personal information onto a computer display 50. If a 1-D bar code 40 is used then personal information is alphanumerical characters and will be shown on computer display 50 as text. If a 2-D bar code 42 is used then information such as a photo I.D. 52 will be displayed upon a computer display 50, as well as the alpha numerical characters. The merchant having derived this information will then compare the personally identifying information from the bar code 40 or 42 with the information provided by the check writer. For example, the merchant can ask the writer what his/her home address would be and the user would have to provide the answer. The writer, if having fraudulently acquired the check, would not know the proper address hidden underneath the bar code.

In addition, as a further security measure, the merchant could compare the photo identification 52 of the negotiable instrument 10 to the check writer. Furthermore, the merchant could compare the pre-printed signature 16 upon the negotiable instrument 10 to a signature 19 placed by the writer upon the negotiable instrument 10 at the signature line 18.

If the merchant's comparison raises any doubts as to the authenticity of the check writer, or the merchant suspects check fraud, the merchant will not accept the check 10, but refuses the check and places a call to the Theft I.D. Hotline 17 to inform the issuing bank that the checks have been stolen, lost or compromised. If the merchant determines that the writer is not fraudulently writing the check then the merchant can complete the transaction and accept the check as tender.

It should be noted that this comparison is done without the need of any check validation programs in which the check must be electronically validated by a bank or other credit department. Therefore, this validation may be done in addition to other check validation programs which determines whether or not there is adequate funds in the bank account and may be done without adding any additional time to the validation programs that may be already in place with merchants. Also, the merchant may simply wish to accept the check if the merchant has recorded the persons identity and address in a database so that it would make it easier to contact the person if sufficient funds are not available and it is also possible to post the persons picture and name in a data base of people from whom checks are no longer accepted.

Figure 5:
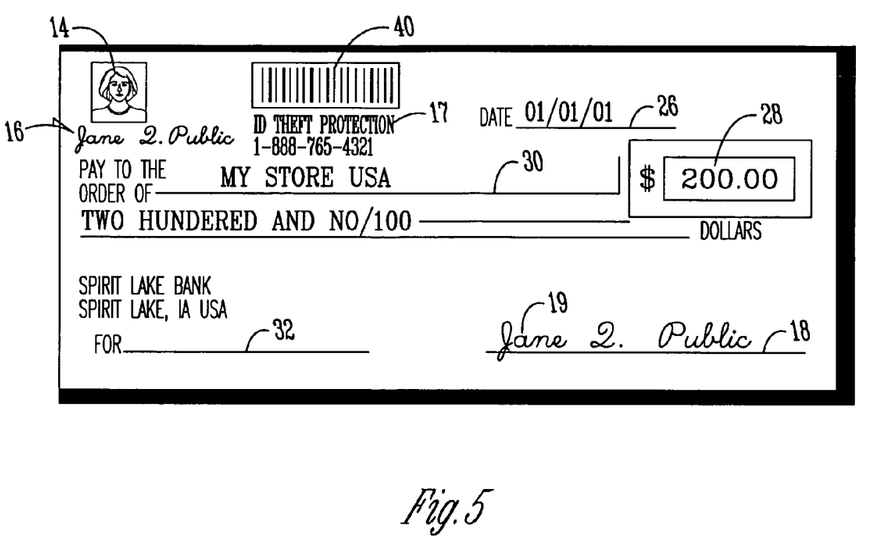
FIG. 5 is a top plan view of an example of a negotiable instrument with built-in fraud and identity theft protections.
Figure 6:
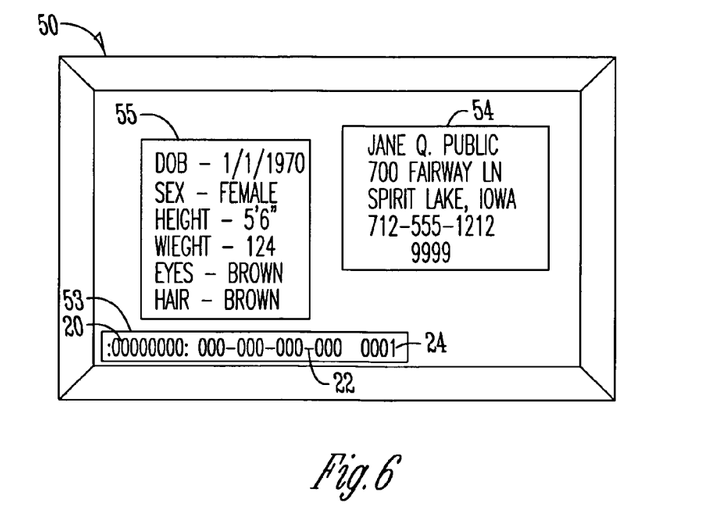
FIG. 6 is a front view of a computer screen displaying information hidden in the bar code regions of FIG. 5.

FIG. 5 is a top plan view of an example of a negotiable instrument 10 with built-in fraud and identity theft protections. As seen in FIG. 5, the check 10 employs additional security measures for discouraging fraud and identity theft. In particular, the check 10 discloses a photo I.D. 14 at the upper left-hand corner of the check 10. The photo I.D. 14 is a current image of the account holder. If the account is a joint account, the photo I.D. 14 for both account holders can be shown at 14. Also pre-printed on the face of the check is the account holder's signature 16, directly below the photo I.D. 14. An I.D. Theft Hotline 17 showing a toll free number to contact the issuing bank to alert them of the checks being lost, stolen or compromised is also shown closely adjacent the bar code 40. In this instance, a 1-D bar code 40 is positioned to the right of the photo I.D. 14. The 1-D bar code 40 is used to encrypt and secure the account holder's personally identifying information. The alphanumeric information encrypted in 1-D bar code 40 includes the name, address and telephone number of the account holder, the bank routing number, account number and check number, as well as physically identifying features of the account holder, such as date of birth, gender, height, weight, eye and hair color. Thus, in this instance, the account holder's signature 16 and photo 14 constitute all of the account holder's personally identifying information that is openly visible on the face of the check. Encrypted within the 1-D bar code 40 is the account holders address and phone number, the bank account number, the bank routing number and check number, as well as the account holder's date of birth (DOB), gender, height, weight, eye and hair color. At the point and time of the transaction, the check writer presents the check 10 to the merchant as tender after signing 19 the check 10 on the signature line 18. The merchant compares the pre-printed signature 16 with the check writer's signature 19 located on the signature line 18, before scanning the check 10. If the merchant detects a difference in the pre-printed signature 16 and the check writer's signature 19 the merchant would refuse the check and contact the I.D. Theft Hotline 17 to inform the issuing bank that the checks may have been lost, stolen or fraudulently compromised. On the other hand, if the merchant finds that the pre-printed signature 16 and the check writer's signature 19 are similar, the merchant scans the check 10 to read the 1-D barcode 40. Before the merchant is able to view the personally identifying information encrypted in the bar code 40, an additional precautionary measure could be implemented to thwart off identity theft and fraudulent use of negotiable instruments. In this instance, the computer screen 50 instructs the merchant to have the check writer enter a PIN number or security code to into the credit card scanner or any other PIN/security code accepting device. Thus, the merchant is not able to view the personally identifying information encrypted by the 1-D bar code 40 until the check writer enters the correct PIN number or security code associated with the account. The check writer enters a PIN number or security code into the credit card scanner. The code entered by the check writer is compared to the code needed to decrypt the 1-D bar code 40. If the code entered by the check writer is incorrect, the check writer is given another opportunity to enter the correct code. Upon successive failures to correctly enter the correct PIN number or security code, the merchant refuses to accept the check and calls the I.D. Theft Hotline 17 to inform the issuing bank that the checks may have been lost, stolen or fraudulently compromised. When the correct PIN number or security code is entered, the personally identifying information associated with the account holder appears on the merchant's computer display 50. At this point, the merchant has access to all the information needed to process the check 10, but uses the information on the computer display 50 to verify the check writer's identity with the account holder's information. For instance, the merchant may inquire of the check writer what their current address, phone number and/or date of birth is to check against the information presented on the computer display 50. If the information presented by the check writer comports with the information on the computer display 50 the merchant accepts the check 10 and processes the check 10 using the bank account number 22 and routing number 20 presented on the computer display 50. On the other hand, if the merchant is not able to verify the information on the computer display 50, the merchant refuses to accept the check and calls the I.D. Theft Hotline 17 to inform the issuing bank that the checks may have been lost, stolen or fraudulently compromised. FIG. 6 is a front view of a computer display 50 displaying information hidden in the bar code regions of FIG. 5. The information presented on the computer display 50 consists of a text display 54 showing the account holder's name, address and phone number. In a second text display 55 the account holder's date of birth (DOB), sex, height, weight, hair and eye color is shown. A third text display 53 shows the bank's routing number 20, the account number 22 and the check number 24. This information is obscured on the face of the check 10 and not readily perceptible as a PIN number or security code is needed to decrypt the bar code 40.

Figure 7:
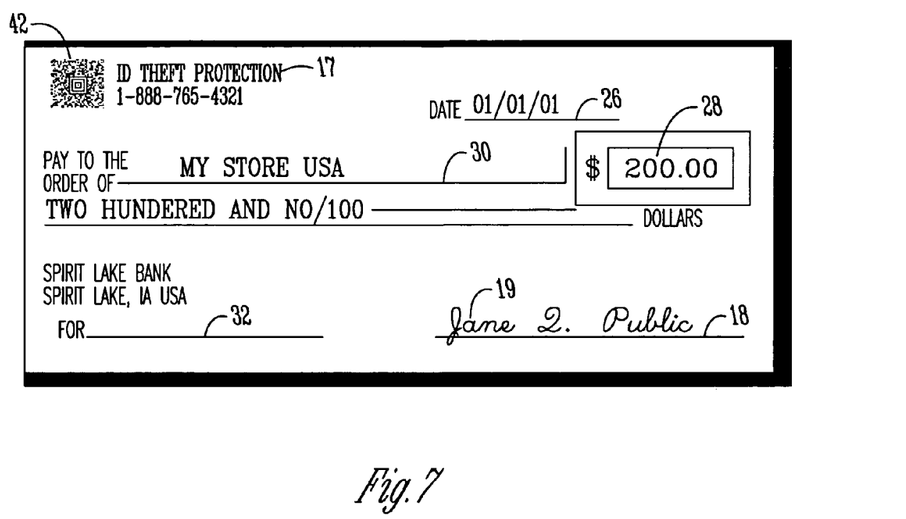
FIG. 7 is a top plan view of another example of a negotiable instrument with built-in fraud and identity theft protections.

FIG. 7 is a top plan view of another example of a negotiable instrument with built-in fraud and identity theft protections. FIG. 7 shows a check 10 having a 2-D bar code 42 located in the upper left hand corner of the check 10. Effectively located adjacent the bar code 42 is an I.D. Theft Hotline 17 showing a toll free number to contact the issuing bank to alert them of the account holder's checks being lost, stolen or fraudulently compromised. Using a 2-D bar code 42 allows all personally identifying information about the account and the account holder to be encrypted and remain visually imperceptible on the face of the check 10. The face of the check 10 is void of the account holder's picture and signature, as well as their address and telephone number. The face of the check also conceals banking information needed for processing the check, such as the account number, bank routing number and check number, all which could potentially be used by others to create fraudulent checks, deposit slips or IDs.

Figure 8:
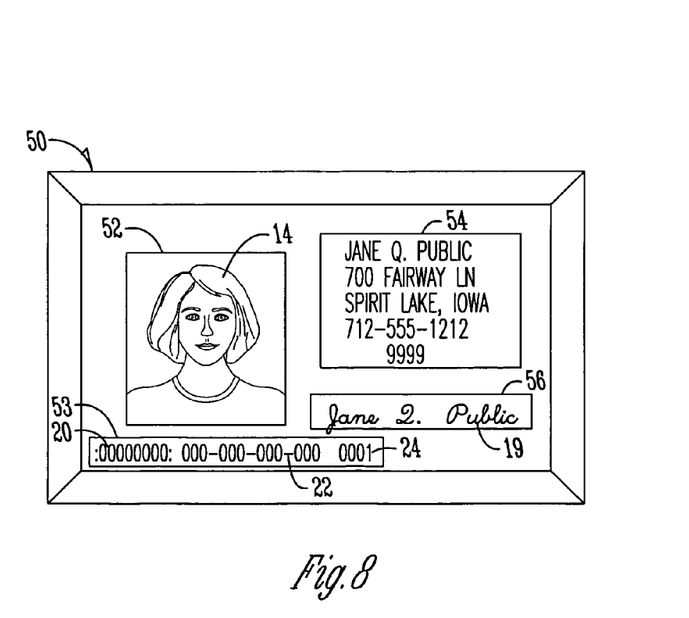
FIG. 8 is a front view of a computer display showing information hidden in the bar code regions of FIG. 7.

The process for transacting the check 10 in FIG. 7 is similar to the process discussed for the check 10 in FIG. 5. Specifically, the check writer presents the check 10 for tender to a merchant, after the check writer has signed 19 the check 10 along the signature line 18. The merchant scans the check 10. The merchant's computer display 50 instructs the merchant to have the check writer enter into the credit card scanner or other alphanumeric receiving device the check writer's PIN number or security code. As another means of acquiring the check writer's PIN number or security code the credit card scanner could prompt the check writer to enter their PIN number or security code. Once the check writer has successfully entered the correct PIN number or security code for decrypting the 2-D bar code 42, the encrypted information is shown on the merchant's computer display 50. If the code entered by the check writer is incorrect, the check writer is given another opportunity to enter the correct code. Upon successive failures to enter the correct PIN number or security code, the merchant refuses to accept the check 10 and calls the I.D. Theft Hotline 17 to inform the issuing bank that the account holder's checks may have been lost, stolen or fraudulently compromised. FIG. 8 is a front view of a computer display showing information hidden in the bar code regions of FIG. 7. In particular, the merchant's computer display 50 shows a first text display 54 with the account holder's name, address and phone number. A second text display 53 shows the routing number 20 for the issuing bank, the account number 22 and the check number 24. A first image display 52 shows a picture 14 of the account holder and a second image display 56 shows the account holder's signature 19. The merchant can use any and all of the information shown on the computer display 50, to the extent necessary, to verify the identity of the check writer. For instance, the merchant can compare the account holder's picture 14 shown on the computer screen 50 with the check writer to verify identity. The merchant may also choose to have the check writer verify their address and phone number shown in the first text display 54. If the check writer's identity comports with the information provided the merchant on the computer display 50, the merchant can then use the account number 22, bank routing number 20 and check number 24 to process the check 10. After the merchant has accepted and processed the check 10, the account holder's personally identifying information is removed from the merchant's computer display 50 and is irretrievable unless the check writer successfully enters their PIN number or security code. Otherwise, if the merchant is unable to verify the identity of the check writer the merchant would refuse the check 10 and call the I.D. Theft Hotline 17 to inform the issuing bank that the account holder's checks may have been lost, stolen or fraudulently compromised.

Figure 9:
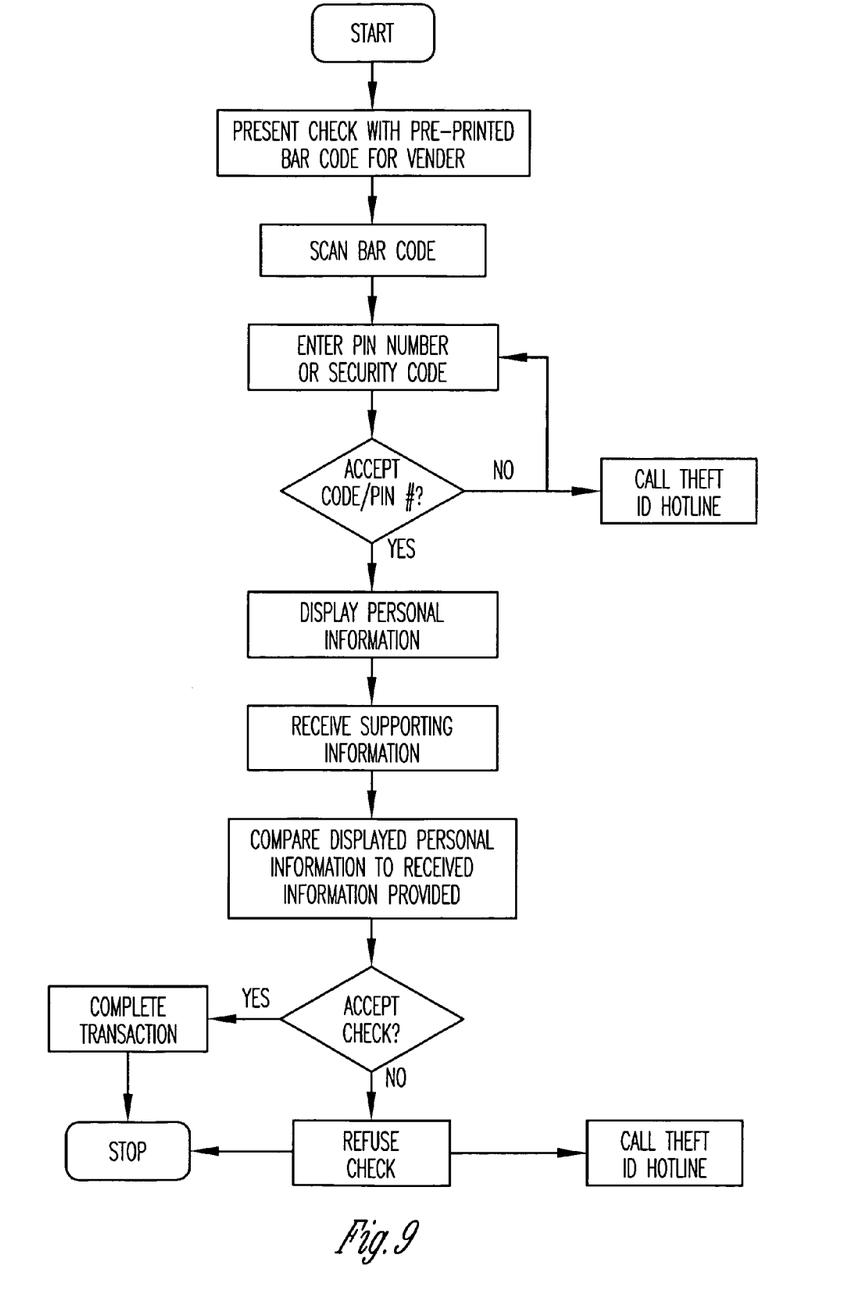
FIG. 9 is a flow chart of the method of the present invention.

FIG. 9 is a flow chart of the method of the present invention. In FIG. 9, the method of using the checks disclosed in FIG. 5 and FIG. 7 is outlined in a flow chart. Specifically, the check writer presents the check 10 with either a pre-printed 1-D 40 or 2-D 42 bar code to a merchant. The merchant handles the check 10 and notes that in one embodiment the check 10 contains a pre-printed bar code, a photo identification 14, a pre-printed signature 16, and an I.D. Theft Identification Hotline toll-free telephone number 17. If the check 10 presented uses a 1-D bar code as shown in FIG. 5, the merchant can verify the check writer against the account holder's picture 14 and signature 16 to confirm the check writer's identity. This means that before the merchant scans the 1-D bar code 40, the merchant may check the check writer's signature 19 against the account holder's signature 16 pre-printed on the face of the check 10. The merchant may also use the pre-printed picture 14 of the account holder on the face of the check 10 to verify the identity of the check writer. If the merchant cannot verify the identity of the check writer using the account holder's pre-printed picture 14 and/or signature 16 the merchant would then refuse to accept the check 10. Otherwise, at this point, the merchant scans the bar code and the merchant's computer display 50 prompts the merchant to ask the check writer to enter, using the credit card scanner or other pin entering device, the PIN number or security code associated with the account. If the PIN number is incorrect, the check writer is given additional opportunities to enter the correct PIN number or security code. Upon successive failures to provide the correct PIN number or security code, the merchant refuses to accept the check 10 from the check writer as tender and subsequently contacts the I.D. Theft Hotline 17 to inform the issuing bank that the account holder's checks 10 may have been lost, stolen or fraudulently compromised. If the PIN number or security code is verified, the account holder's personal information is decrypted and shown on the merchants computer display 50. The merchant then uses the account holder's personal information shown on the computer display 50 to verify the identity of the check writer or receive supporting information. For example, in the case where the 2-D bar code 42 of FIG. 7 is used, the merchant would compare the picture 14 on the computer display 50 to verify the identity of the check writer. The merchant would also, as needed to further verify the check writer's identity, ask the check writer for their name, address and phone number. The merchant would also use the account holder's signature 19 shown on the computer display 50 to verify the check writer's signature 19. Thus, the account holder's personally identifying information displayed on the merchant's computer display 50 is compared against the information received from the check writer for identity verification purposes. If the information provided the merchant by the check writer matches the information displayed on the merchant's computer display 50, the merchant would accept the check 10 and complete the transaction. Otherwise, if the information did not match, the merchant would refuse to accept the check 10 and contact the I.D. Theft Hotline 17 to inform the issuing bank that the account holder's checks 10 may have been lost, stolen or fraudulently compromised. Thus, the present system provides the account holder with a fraud and identity theft resistant form of negotiable tender. Sensitive information, such as the account holder's name and address, as well as account number and routing number are kept from view. And, only after the check writer successfully matches the PIN number or security code associated with the account, is the information decrypted at the point and time of the transaction to verify the identity of the check writer. Thus, only the merchant has a limited, short window of time to view the account holder's personal information associated with the account. The information is removed from the merchant's computer display 50 immediately upon the transaction being completed and the merchant accepting the check 10 as tender. The check 10 thus provides merchants and others entrusted with the care of negotiable instruments to have additional mechanisms in place to protect themselves and others against the threat of fraud and/or identity theft. The check 10, including the I.D. Theft Hotline, puts others on notice that the account is a fraud and identity theft resistant account acting as a deterrent to would-be fraudulent users of a negotiable instrument or those fishing for personally identifying information. It should be apparent that various modes of carrying out the invention are contemplated, as are various modifications of the method and the negotiable instrument with fraud protection and that all of these fall within the scope of the invention if that the critical features of the invention outlined above are employed. Applicant intends to claim the widest scope of doctrine of equivalence allowed by current state of the law.

What is claimed is:

1. A method of using a fraud and identity theft resistant checking account to avoid acceptance by a merchant of a fraudulent check and to preserve an identity of an account holder, the method comprising:

receiving a negotiable instrument from a check writer, the negotiable instrument having a pre-printed bar code and an identification theft protection hotline;

concealing from view by using the pre-printed bar code to encode personal identification information comprising a digital photo identification, a signature, an address, a phone number and a name of the account holder;

concealing from view by using the pre-printed bar code to encode bank identification information comprising a bank routing number, a bank account number and a check number;

scanning the pre-printed bar code;

receiving a code with the check, the code being associated with the checking account for deriving personal and bank identification information from the pre-printed bar code;

comparing the personal identification information of the account holder derived from the pre-printed bar code with the address, the phone number and the name of the check writer;

comparing the photo identification of the account holder derived from the pre-printed bar code with the check writer;

comparing the signature of the account holder derived from the pre-printed bar code with a signature placed by the check writer upon the check at the point and time of the transaction;

determining by the merchant whether to accept or refuse the check at the point and time of the transaction by verifying a match between the identity of the account holder and the check writer based on the steps of comparing the personal identification information derived from the pre-printed bar code with information provided by the check writer, comparing the photo identification of the account holder derived from the pre-printed bar code with the check writer, and comparing the signature of the account holder derived from the pre-printed bar code with the signature of the check writer placed upon the check at the point and time of the transaction;

processing by the merchant of the check for payment by using the bank routing number, the bank account number and the check number derived from the pre-printed bar code; and contacting by the merchant the identification theft hotline at the point and time of the transaction to alert a bank associated with the checking account of a fraudulent use of the check, the personal or banking information associated with the account.

2. The method of claim 1 wherein a pre-printed signature of the account holder is visible on the check and not hidden from view using the pre-printed bar code.

3. The method of claim 1 further comprising the step of comparing the pre-printed signature of the account holder upon the check with the signature placed by the check writer upon the check before receiving the code to derive the personal and bank identification information from the pre-printed bar code.

4. The method of claim 1 wherein the photo identification of the account holder is visible on the check and not hidden from view using the pre-printed bar code.

5. The method of claim 4 further comprising the step of comparing the photo identification upon the check to the check writer before receiving the code to derive the personal and bank identification information from the pre-printed bar code.

6. The method of claim 1 wherein the personal and bank identification information is only viewable by the merchant at the point and time of the transaction after receiving the code from the check writer.

7. The method of claim 1 further comprising the step of writing a second code associated with the account on the check for deriving the personal and banking information when the check writer is not physically present at the point and time of the transaction.

8. The method of claim 1 further comprising the step of entering by the check writer the code associated with the account into a code-receiving device for deriving the personal and banking information associated with the account.

* * * * *